Figure 2:
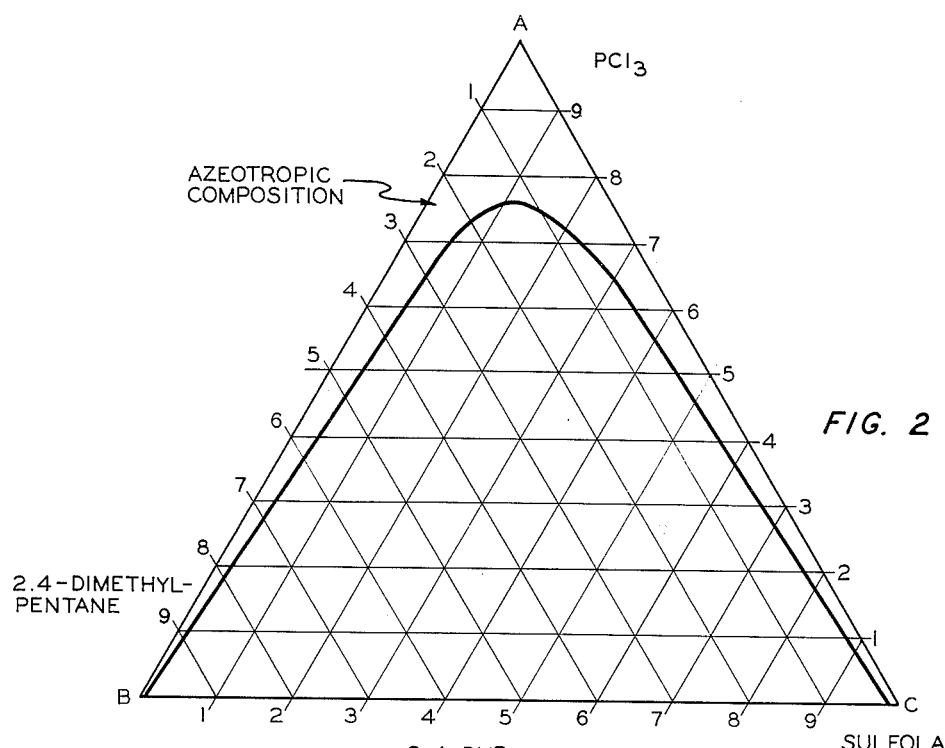

Aug. 31, 1965

G. C. RAY 3,204,003

PHOSPHORUS TRICHLORIDE RECOVERY OPERATION

Filed Oct. 10, 1960

INVENTOR.
GARDNER C. RAY
BY
Hudson & Young
ATTORNEYS

United States Patent Office 3,204,003
Patented Aug. 31, 1965

3,204,003
PHOSPHORUS TRICHLORIDE RECOVERY OPERATION
Gardner C. Ray, Bartlesville, Okla., assignor to Phillips Petroleum Company, a corporation of Delaware
Filed Oct. 10, 1960, Ser. No. 61,460
14 Claims. (Cl. 260—666)

This invention relates to the extraction of a phosphorus halide from its hydrocarbon solution. In one of its aspects, the invention relates to the recovery of a phosphorus halide from a hydrocarbon containing the same which comprises liquid-liquid solvent extracting the same from said hydrocarbon employing a sulfolane. In another aspect, it relates to the extraction of a phosphorus halide from a hydrocarbon solution of the same employing as a selective solvent a sulfolane having the structural characteristics

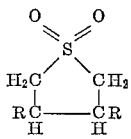

wherein R is selected from the group consisting of hydrogen and an alkyl group having 1 to 4 carbon atoms. In another of its aspects, the invention relates to an improved operation wherein a hydrocarbon is separated by azeotropic and extractive distillation employing a phosphorus trihalide as an entrainer and a sulfolane as herein set forth to recover the phosphorus halide from a hydrocarbon which it has separated in the method. In a further aspect of the invention, it relates to a sulfolane as herein described and gamma butyrolactone which are combined to form a mixed solvent to accomplish the separations herein set forth.

The processes of azeotropic distillation and extractive distillation for separating a hydrocarbon component from another hydrocarbon component of substantially the same boiling point contained in a complex hydrocarbon mixture are well known. In these processes, the hydrocarbon mixture is fractionally distilled in the presence of an added substance (entrainer or solvent) which alters the relative volatilities of the hydrocarbon to such an extent that fractional distillation is feasible. The phosphorus trihalides have been found to be excellent entrainers for the separation of some close boiling hydrocarbons. For example, when a mixture of cyclohexane and 2,4-dimethylpentane is fractionally distilled in the presence of a sufficient amount of phosphorus trichloride, the phosphorus trichloride has been found to azeotrope with only the 2,4-dimethylpentane. In such an azeotrope distillation process, substantially pure cyclohexane is recovered as bottoms product and a mixture of phosphorus trichloride and 2,4-dimethylpentane distills overhead. A more detailed description of the process and azeotropic distillation here mentioned is set forth in U.S. Patent 2,786,804, issued March 26, 1957 to W. T. Nelson, in which there is set forth and claimed the distillation of a mixture of an aliphatic and a close-boiling naphthenic hydrocarbon which comprises distilling the mixture in the presence of at least one of phosphorus trichloride and phosphorus tribromide. In U.S. Patent 2,736,691, issued to W. T. Nelson on February 28, 1956 there is set forth a separation of aromatic hydrocarbons by extractive distillation with phosphorus bromide.

One of the difficulties encountered in distillation processes wherein an added substance or entrainer is employed lies in the separation or recovery of the added substance from the hydrocarbons in the hydrocarbon fraction with which it associates itself. Ordinarily separation or recovery of the added substance or entrainer is effected by phase separation, solvent extraction, azeotropic distillation or extractive distillation processes. The separation of phosphorus trihalides from hydrocarbons by extractive distillation is somewhat difficult and can be expensive because of the reactivity of the phosphorus trihalides with many potential solvents. Thus, for example, water cannot be used in the separation since it readily reacts with the phosphorus trihalides.

I have discovered that the separation of phosphorus halides from mixtures of hydrocarbons can be effected readily by use of a compound having the structural characteristic

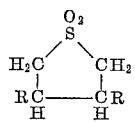

wherein R is a hydrogen or an alkyl radical having 1 to 4, inclusive, carbon atoms. The two R groups can be the same or different.

Also, I have discovered that gamma butyrolactone, which of itself is not suited for liquid-liquid extraction of phosphorus halide-hydrocarbon azeotropes because it is miscible with the hydrocarbon-halide mixture, can be used advantageously together with a sulfolane as herein set forth, i.e., as a mixed solvent which not only avoids miscibility but also prevents, when this tends to occur, the formation of some solid sulfolane material in the pipes of the equipment used. For example, tetramethylene sulfone, otherwise known as sulfolane, has a fairly high freezing point, namely, 27.4–27.8° C. Thus, while gamma butyrolactone is not suited for liquid-liquid extraction because it is miscible with the azeotrope, it has been found useful in the forming of a mixed solvent. In U.S. Patent 2,922,753, issued January 26, 1960, to W. T. Nelson, there is set forth and described a process for the resolution of an azeotrope of a phosphorus trihalide and a hydrocarbon selected from the group consisting of aliphatic hydrocarbons containing 6 and 7 carbon atoms and benzene which comprises subjecting said azeotrope to extractive distillation in the presence of an aliphatic lactone selected from the group consisting of lactones formed from aliphatic acids having 4 to 12 carbon atoms.

It is an object of this invention to provide a method for the extraction of a phosphorus halide from a hydrocarbon solution containing the same. It is another object of this invention to provide an improved method for the separation of a hydrocarbon employing phosphorus halide. It is another object of this invention to improve the recovery of phosphorus halide from a hydrocarbon in which it may be further followed by the separation of a hydrocarbon employing phosphorus halide. A still further object of the invention is to provide a mixed solvent for the separation herein set forth.

Other aspects, objects, and the several advantages of the invention are apparent from a study of this disclosure, the drawing, and the appended claims.

According to this invention, a phosphorus halide, for example, phosphorus trichloride and/or phosphorus tribromide is recovered from a hydrocarbon containing the same by selective extraction of the mixture with a sulfolane as herein described. Also, according to the invention, the sulfolane can be used together with another solvent such as gamma butyrolactone, the latter being unsuited for use by itself as a solvent for extractive distillation of, say, phosphorus trichloride-hydrocarbon azeotrope, because it is miscible with the azeotrope, as indicated herein.

Examples of selective solvents according to the invention are:

Sulfolane
3-methylsulfolane
3,4-dimethylsulfolane
3-ethyl-4-methylsulfolane
3,4-diethylsulfolane
3,4-di(isopropyl)sulfolane
3,4-di(n-butyl)sulfolane
3-n-propylsulfolane Various methods have been described for the preparation of these sulfolanes. Commonly, 1,3-butadiene and substituted butadienes are condensed with sulfur dioxide so as to yield the corresponding unsaturated sulfone. The unsaturated sulfones are converted by hydrogenation to the saturated compounds which are broadly termed sulfolanes, although sulfolane itself is tetramethylene sulfone. These compounds are particularly suitable since they are relatively inexpensive, non-toxic, thermally stable, and commercially available in adequate quantities. Further, these compounds are chemically inert toward the phosphorus halide under the extraction and stripping conditions.

The above described sulfolanes are particularly useful for the separation of an azeotrope of hydrocarbon and phosphorus trihalide. Examples of specific hydrocarbon azeotropes which can be resolved include:

2,4-dimethylpentane and phosphorus trichloride
n-Hexane and phosphorus trichloride
2,3-dimethylpentane and phosphorus trichloride Similarly, azeotropes are formed with phosphorus tribromide.

The invention is not restricted to separation of the phosphorus trihalides from azeotropes. The phosphorus trihalides can be separated from other hydrocarbons by use of the sulfolanes. For example, the separation can be effected from solution in Methylcyclohexane
Mehylcyclopentane
n-Octane
n-Heptane and the like.

In one embodiment of this invention, one or more of the above described sulfolanes is employed in conjunction with a lactone, e.g., gamma butyrolactone. Other lactones which can be admixed with sulfolane are gamma valero lactone and, in general, aliphatic lactones formed from aliphatic acids having 4 to 12 carbon atoms.

Figure 1:
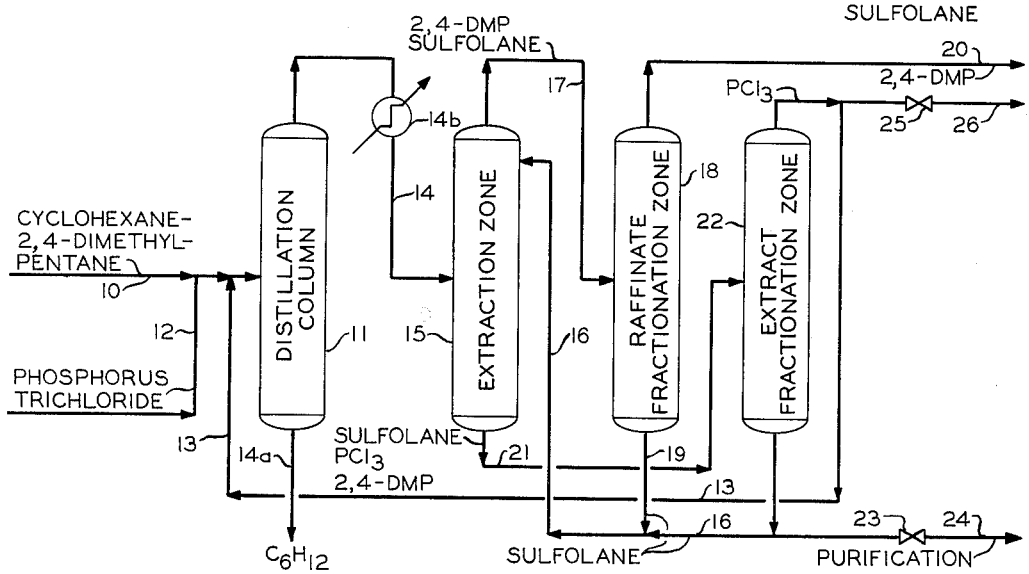

Referring to the drawing FIGURE 1 shows an azeotropic distillation of cyclohexane-2,4-dimethylpentane employing phosphorus trichloride as an azeotrope former and sulfolane to recover phosphorus trichloride from the azeotrope which is formed. FIGURE 2 is a trilinear graph constructed employing the data given in Table I hereof.

Referring now to FIGURE 1, the invention will be moe fully explained. A mixture of cyclohexane and 2,4-dimethylpentane is introduced through line 10 into distillation column 11. Also introduced into column 11 through line 10 is a sufficient quantity of phosphorus trichloride to azeotrope with said 2,4-dimethylpentane. The phosphorus trichloride is introduced into line 10 through line 12 from a source not shown and/or through line 13. In column 11, an azeotropic distillation is effected with substantially pure cyclohexane being removed from the bottom of said column through line 14A as a product of the process. An azeotropic mixture substantially of phosphorus trichloride and 2,4-dimethylpentane is removed overhead from column 11, condensed in condenser 14b, and passed through line 14 into extraction zone 15 wherein it is contacted countercurrently in a sufficient number of equilibrium stages with a stream of sulfolane introduced into the upper portion of extraction zone 15 through line 16. Extraction zone 15 can comprise any suitable type of a contacting means such as a bubble cap column, a packed column, or a rotating disc column.

A hydrocarbon-rich raffinate stream containing principally 2,4-dimethylpentane together with a minor proportion of sulfolane is removed from the upper portion of extraction zone 15 through line 17 and passed to fractionation zone 18. Sulfolane is removed from fractionation zone 18 through line 19 and returned to extraction zone 15 through line 16. A stream of 2,4-dimethylpentane is removed from fractionation zone 18 as an overhead stream through line 20.

A solvent-rich extract stream containing principally sulfolane and phosphorus trichloride together with a minor proportion of hydrocarbon is removed from the lower portion of extraction zone 15 through line 21 and introduced into fractionation zone 22. Sulfolane is removed from fractionation zone 22 through line 16 and returned to extraction zone 15. If desired, a portion of the sulfolane from line 16 can be passed through valve 23 and line 24 to purification in order to prevent impurities from building up in the system and then returned to extraction zone 15. Phosphorus trichloride is removed as an overhead stream from fractionation zone 22 through line 13 and returned to distillation column 11. If desired, a portion of the phosphorus trichloride in line 13 can be withdrawn through valve 25 and line 26 for further purification to remove impurities to prevent same from building up in the system.

While the description of the invention has been directed principally to the separation of phosphorus halides from hydrocarbon fractions produced in fractional distillation processes, it is not so limited. The sulfolane solvents or solvent mixtures containing them and the processes employing same described herein can be employed in separating any mixture of a phosphorus halide and a hydrocarbon, toward which said halide is chemically inert, regardless of the method of formation of said mixture.

Furthermore, while the description of the invention has been directed to the separation of phosphorus trichloride and phosphorus tribromide from hydrocarbons, the invention is not so limited. The invention is applicable to the separation of any phosphorus halide, which is chemically inert to the sulfolanes of the invention under the conditions of the separation, and which exists as such in a mixture of said halide and a hydrocarbon toward which said halide is chemically inert, the sulfolanes and the hydrocarbon being of incomplete miscibility.

The extraction process of the invention can be carried out under atmospheric conditions of temperature and pressure; however, reduced temperatures and pressures as well as elevated temperatures and pressures can be employed. The temperature can vary over a considerable range and should be below the critical solution temperature of the hydrocarbon in the sulfolane but above the freezing point of the two liquid phases formed. For example, the critical solution temperature of 2,4-dimethylpentane and sulfolane is above 80° C. and temperatures in the range of 0–80° C. can be employed for the separation of phosphorus trichloride and 2,4-dimethylpentane when sulfolane is employed as a solvent.

The temperatures and pressures employed for any given separation will be understood by those skilled in the art. Generally, the extraction with the sulfolanes will be effected at a temperature in the range of 0 to 200° C. and below the critical temperature of the hydrocarbon and to insure having the hydrocarbons in a liquid phase which contacts the sulfolane or mixture of sulfolanes. The pressures are commonly atmospheric, but higher pressures can be employed as desired, e.g., pressures at least as high as 1,000 p.s.i. can be employed.

In general, it will be found that 1–20, preferably 5–10, volumes of sulfolane or solvent mixture will be used for each volume of mixture to be separated.

EXAMPLE I

Mixtures were prepared by mixing 2,4-dimethylpentane, phosphorus trichloride, and sulfolane (tetramethylene sulfone). The mixtures were shaken at 25° C. for 30 minutes or longer to insure attainment of equilibrium conditions. Portions of the extract phase and liquid raffinate phase were collected. The composition of each phase was determined. The distribution constants expressing the ratio, K, of the concentration of each component in the extract phase and the raffinate phase was computed. The value for the relative distribution ratio, $K_r$, is the value of K for the components relative to one component (in this case, 2,4-dimethylpentane). The results of these tests are summarized in Table I.

TABLE I
*Ternary equilibrium data at 25° C.*

| Mixture No. | | Total Charge, Vol. Percent | Extract Vol. Percent | Raffinate, Vol. Percent | K | $K_r$ |
|---|---|---|---|---|---|---|
| 1* | 2,4-dimethylpentane | 12.7 | 2.7 | 35.8 | 0.076 | 1.0 |
|    | Phosphorus trichloride | 37.3 | 28.0 | 59.6 | 0.47 | 6.2 |
|    | Sulfolane | 50.0 | 69.3 | 4.6 | | |
| 2* | 2,4-dimethylpentane | 19.9 | 4.3 | 35.2 | 0.17 | 1.0 |
|    | Phosphorus trichloride | 60.2 | 34.9 | 69.2 | 0.50 | 3.0 |
|    | Sulfolane | 19.9 | 60.8 | 5.6 | | |
| 3* | 2,4-dimethylpentane | 16.8 | 3.3 | 19.3 | 0.17 | 1.0 |
|    | Phosphorus trichloride | 66.7 | 41.4 | 73.7 | 0.56 | 3.3 |
|    | Sulfolane | 16.5 | 55.3 | 7.0 | | |

*For mixtures 1, 2, and 3, the extracts amounted to 69.8, 25.7, and 18.5 percent by volume, respectively. Conversely, the raffinates for these mixtures 1, 2, and 3 amounted to 30.2, 74.3, and 81.5 percent by volume.

Table II summarizes the results of the determination of the ternary cloud points at 25° C. for mixtures of 2,4-dimethylpentane, phosphorus trichloride, and sulfolane. These data, together with the results of Table I, permit construction of the ternary diagram shown as FIGURE 2. This figure can be used by one skilled in the art to readily ascertain compositions which form non-miscible phases.

TABLE II
*Ternary cloud point compositions at 25° C.*

| | Volume Percent in Cloud Point Composition | | | |
|---|---|---|---|---|
| | 1 | 2 | 3 | 4 |
| 2,4-dimethylpentane | 3.5 | 4.1 | 5.5 | 12.4 |
| Phosphorus trichloride | 40.0 | 48.2 | 66.9 | 76.4 |
| Sulfolane | 56.5 | 47.7 | 27.6 | 11.2 |

Table III presents solubility data. These data emphasize the low solubility of the hydrocarbons in sulfolane and the low-solubility of the sulfolane in the hydrocarbons.

TABLE III
*Binary solubility data at 25° C.*

| Solute | Solvent | Volume Percent |
|---|---|---|
| 2,4-dimethylpentane | Sulfolane | 1.26 |
| Sulfolane | 2,4-dimethylpentane | 0.20 |
| Cyclohexane | Sulfolane | 3.41 |
| Sulfolane | Cyclohexane | 0.22 |

The use of a mixture of gamma butyrolactone and sulfolane for liquid-liquid extraction of an azeotropic mixture of $PCl_3$ and 2,4-dimethylpentane is shown by the data in the following Table IV.

TABLE IV
*Ternary equilibrium data at 24° C. (75° F.)*

| Component | Amt. in Charge | | Extract [1] | Raffinate [1] | K | $K_r$ |
|---|---|---|---|---|---|---|
| | Vol. percent | Wt. percent | | | | |
| 2,4-dimethylpentane | 12.5 | 6.5 | 3.4 | 21.2 | 0.16 | 1.0 |
| Phosphorus trichloride | 37.6 | 46.4 | 40.8 | 72.2 | 0.57 | 3.5 |
| Sulfolane | 24.9 | 24.9 | [1] 55.8 | [2] 6.6 | | |
| Gamma-butyrolactone | 25.0 | 22.2 | | | | |

[1] The extract and the raffinate fractions amounted to 82.1 and 17.9 weight percent of the total.
[2] Combined weight percent of sulfolane and gamma butyrolactone.

Reasonable variation and modification are possible within the scope of the foregoing disclosure, the drawing, and the appended claims to the invention the essence of which is that there have been provided a method for the recovery of a phosphorus halide from a hydrocarbon containing the same employing a sulfolane and/or a lactone, as set forth herein; an improved method for separating a hydrocarbon employing a phosphorus halide, in which method the phosphorus halide is recovered for reuse by liquid-liquid extraction with a sulfolane and/or a lactone as described herein; and a novel solvent suited for the recovery of a phosphorus halide from a hydrocarbon, also as set forth herein.

I claim:

1. A method for the separation of a phosphorus halide from a hydrocarbon toward which said halide is chemically inert containing the same which comprises contacting the mixture of said halide and hydrocarbon with a sulfolane in a liquid-liquid solvent extraction operation said sulfolane being effective to remove said halide from the mixture of said halide and hydrocarbon by forming an extract with said halide.

2. A method according to claim 1 wherein said sulfolane has the following structural characteristics

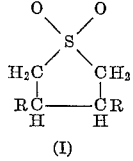

(I)

wherein R is selected from the group consisting of hydrogen and an alkyl group having 1 to 4 carbon atoms.

3. As a selective solvent especially suited to the separation of a phosphorus halide and a hydrocarbon from a mixture containing said halide and said hydrocarbon by forming an extract containing said phosphorus halide which comprises a mixture of a substantial amount of a sulfolane of Formula I with a substantial amount of an aliphatic lactone selected from the group consisting of lactones formed from aliphatic acids having 4–12 carbon atoms.

4. The recovery of a phosphorus halide from a hydrocarbon toward which said halide is chemically inert containing the same which comprises liquid-liquid solvent extracting the same from said hydrocarbon employing a sulfolane effective to remove said halide from said hydrocarbon by forming an extract with said halide.

5. The recovery of phosphorus trichloride from 2,4-dimethylpentane containing the same which comprises liquid-liquid solvent extracting the same from said hydrocarbon employing a sulfolane effective to remove said halide from said hydrocarbon by forming an extract with said halide.

6. The recovery of phosphorus trichloride from 2,3-dimethylpentane containing the same which comprises liquid-liquid solvent extracting the same from said hydrocarbon employing a sulfolane effective to remove said halide from said hydrocarbon by forming an extract with said halide.

7. The recovery of phosphorus trichloride from n-hexane containing the same which comprises liquid-liquid solvent extracting the same from said hydrocarbon employing a sulfolane effective to remove said halide from said hydrocarbon by forming an extract with said halide.

8. The recovery of phosphorus trichloride from methylcyclohexane containing the same which comprises liquid-liquid solvent extracting the same from said hydrocarbon employing a sulfolane effective to remove said halide from said hydrocarbon by forming an extract with said halide.

9. The recovery of phosphorus trichloride from methylcyclopentane containing the same which comprises liquid-liquid solvent extracting the same from said hydrocarbon employing a sulfolane effective to remove said halide from said hydrocarbon by forming an extract with said halide.

10. The recovery of phosphorus trichloride from n-octane containing the same which comprises liquid-liquid solvent extracting the same from said hydrocarbon employing a sulfolane effective to remove said halide from said hydrocarbon by forming an extract with said halide.

11. The recovery of phosphorus trichloride from n-heptane containing the same which comprises liquid-liquid solvent extracting the same from said hydrocarbon employing a sulfolane effective to remove said halide from said hydrocarbon by forming an extract with said halide.

12. A method for the purification of cyclohexane containing dimethylpentane which comprises contacting said cyclohexane with phosphorus trichloride in a cyclohexane purification distillation operation obtaining a phosphorus trichloride dimethylpentane-azeotrope and purified cyclohexane product, contacting said azeotrope with a sulfolane in liquid-liquid solvent extraction obtaining a raffinate containing dimethylpentane and an extract containing phosphorus trichloride, subjecting said extract to distillation obtaining as overhead phosphorus trichloride and as bottoms sulfolane, passing said phosphorus trichloride to the cyclohexane purification operation and passing said sulfolane to the phosphorus trichloride recovery operation.

13. As a selective solvent especially suited to the separation of a phosphorus halide and a hydrocarbon from a mixture containing said halide and said hydrocarbon by forming an extract containing said phosphorus halide which comprises a mixture of a substantial amount of tetramethylene sulfone and a substantial amount of gamma butyrolactone.

14. In the purification of a hydrocarbon mixture, a component of which forms an azeotrope with a phosphorus halide and in which an operation is performed wherein the hydrocarbon mixture is contacted with a phosphorus halide under azeotrope forming conditions and a phosphorus halide-mixture component azeotrope and a purified hydrocarbon are recovered, the improvement which comprises contacting in said contacting zone said phosphorus halide-hydrocarbon component with a sulfolane of Formula I in liquid-liquid solvent extraction, thus obtaining as a raffinate said hydrocarbon component and as an extract said sulfolane containing said phosphorus halide, passing said extract to a distillation operation, in said distillation operation obtaining as overhead said phosphorus halide and as bottoms said sulfolane, returning the thus recovered phosphorus halide to said contacting zone and returning said sulfolane to said liquid-liquid solvent extraction.

References Cited by the Examiner

UNITED STATES PATENTS

| | | | |
|---|---|---|---|
| 2,360,861 | 10/44 | Pierotti et al. | 208—325 |
| 2,452,949 | 11/48 | Morris et al. | 260—332.1 |
| 2,786,804 | 3/58 | Nelson | 202—42 |
| 2,831,905 | 4/58 | Nelson | 208—325 |

FOREIGN PATENTS 628,215  9/61  Canada.

ALPHONSO D. SULLIVAN, *Primary Examiner.*